United States Patent [19]

Akutin et al.

[11] 4,325,687

[45] Apr. 20, 1982

[54] DEVICE FOR EXPANDING HEAT-SHRINKABLE POLYMER TUBES

[76] Inventors: Modest S. Akutin, B. Tishinsky pereulok, 26, korpus 16, kv. 16, Moscow; Sergei K. Dimakov, p/o Vozdvizhenskoe, poselok 1"A", Moskovskaya oblast, Zagorsky raion; Stanislav V. Ostapchuk, ulitsa Eletskaya, 9, korpus 3, kv. 415, Moscow; Boris P. Pashinin, Leningradskoe shosse, 112/1, korpus 4, kv. 1032, Moscow; Vitaly P. Perepelkin, ulitsa Lobachevskogo, 10, kv. 60, Moscow, all of U.S.S.R.

[21] Appl. No.: 165,011

[22] Filed: Jul. 1, 1980

[51] Int. Cl.³ .................. B29C 17/07; B29D 23/03
[52] U.S. Cl. .................. 425/387.1; 264/503; 264/520; 264/521; 425/392; 425/397; 425/403
[58] Field of Search ............ 425/387.1, 329, 392, 425/397, 403, 335, 342.1, 343; 264/503, 523, 535, 564, 520, 521

[56] References Cited

U.S. PATENT DOCUMENTS

| | | | |
|---|---|---|---|
| 2,936,491 | 5/1960 | Hamlin | 425/392 X |
| 3,018,518 | 1/1962 | Jefferys | 425/387.1 X |
| 3,182,355 | 5/1965 | Arnaudin | 425/392 X |
| 3,201,827 | 8/1965 | Reynolds et al. | 425/292 X |
| 3,257,689 | 6/1966 | Weyer | 425/392 X |
| 3,306,962 | 2/1967 | Pepper | 264/503 |
| 3,360,826 | 1/1968 | Lorang | 425/392 |
| 3,495,301 | 2/1970 | Stephens et al. | 425/392 |
| 3,692,889 | 9/1972 | Hetrich | 264/503 |
| 4,017,244 | 4/1977 | Vellani | 264/503 X |

*Primary Examiner*—Philip Anderson
*Attorney, Agent, or Firm*—Lilling & Greenspan

[57] ABSTRACT

A device for expanding heat-shrinkable polymer tubes includes inlet and outlet chambers coaxially and consecutively arranged for immediate contact in the direction of tube advancement. Each chamber is made up of adjoining bushes having threads at the inner surface thereof. The threads of adjacent bushes of each chamber are of the opposite direction. A group of bushes of each chamber having a common thread direction is provided with an independent rotating drive.

1 Claim, 2 Drawing Figures

DEVICE FOR EXPANDING HEAT-SHRINKABLE POLYMER TUBES

FIELD OF THE INVENTION

The present invention relates to apparatus for manufacturing tubular stock in the form of tubes, sleeves and hoses, and more particularly to devices for expanding heat-shrinkable polymer tubes.

The invention may find application in the manufacture of heat-shrinkable polymer tubes and as a transport means adapted to advance tubes along equipment elements of the production lines with preselected and controlled speeds.

BACKGROUND OF THE INVENTION

One of the most promising materials used for protection of corrosion-susceptible stock against ambient medium for electrical insulation of power line connections and for sealing water and gas lines is a heat-shrinkable material. Tubes, sleeves and hoses made from polymer materials and having been extended at temperatures approaching melt crystallization phase are thermally fixed by cooling to be thereafter capable of reducing their dimetions by being heated and shrink-fitted over objects to be insulated. The use of heat-shrinkable tubes can only be efficient if the tubes are preferably capable of radial shrinkage; however, advancement of the tubes along equipment elements of the production lines in the course of expansion inevitably results in unwanted longitudinal extension of the tubes. Also, mechanical resistance forces arising in the course of tube advancement along equipment elements of the production lines contribute to low efficiency of the tube expansion process, rendering it unstable and low-speed.

Known in the art are apparatus for expanding polymer tubes comprising tapered mandrels or drift-plugs to be drawn inside the tubes. In order to reduce mechanical resistance forces caused by friction, the working surface of the drift-plug is defined by rotating bodies (cf. U.S. Pat. No. 3,201,827).

The rotating bodies mounted in sockets fail to adequately reduce longitudinal extension of the tubes, since contacting surfaces of the rotating bodies and those of the sockets give rise to considerable friction forces preventing easy longitudinal advancement of the tube.

Also known are apparatus for expanding heat-shrinkable polymer tubes comprising inlet and outlet chambers coaxially and consecutively arranged for immediate contact in the direction of the tube advancement, the outlet chamber having a larger diameter than that of the inlet chamber, and a means for creating an overpressure inside the polymer tube (cf. U.S. Pat. No. 3,370,112).

These apparatus feature the inlet and outlet chambers in the form of cylinders, the inner diameter thereof corresponding to the outer diameter of the tube prior to and after expansion. Therefore, the tube to be expanded inevitably contacts the cylinder walls, which results in an increase in the forces of friction arising from the tube sliding along the walls of both the inlet and the outlet chambers, thus causing considerably longitudinal extension of the expandable tubes. In addition, application of antifriction materials fails to reduce friction of the heated tube material against the walls of the chambers. The heretofore described prior art apparatus has limited application from the viewpoint of increasing production efficiency of the process of tube expansion because of the well known dependence between the coefficient of friction and the speed of tube sliding, the coefficient increasing with an increase in the speed of sliding.

SUMMARY OF THE INVENTION

It is an object of the present invention to provide a highly efficient device for expanding heat-shrinkable polymer tubes, which will drastically minimize longitudinal extension of the tubes.

Another object of the invention is to make the process of tube expansion more efficient.

These objects are attained by a device for expanding heat-shrinkable polymer tubes comprising an inlet chamber and an outlet cooling chamber coaxially and consecutively arranged for immediate contact in the direction of the tube advancement, the outlet cooling chamber being of a larger diameter than that of the inlet chamber, and a means for creating an overpressure inside the polymer tube. According to the invention, both the inlet chamber and the outlet cooling chamber are in the form of adjoining bushes provided with threads at the inner surface thereof, the threads of adjacent bushes being of the opposite direction, and a group of bushes of each chamber having threads of a common direction being provided with an independent rotating drive.

Such a constructional arrangement of the device for expanding polymer tubes according to the invention helps reduce longitudinal extension of polymer tubes to a required value at high speeds of the tube expansion process.

BRIEF DESCRIPTION OF THE DRAWINGS

The foregoing and other objects of the present invention will become readily apparent from a detailed description of the preferred embodiment thereof taken in conjunction with the accompanying drawings, in which.

DETAILED DESCRIPTION OF THE INVENTION

Figures 1, 2:
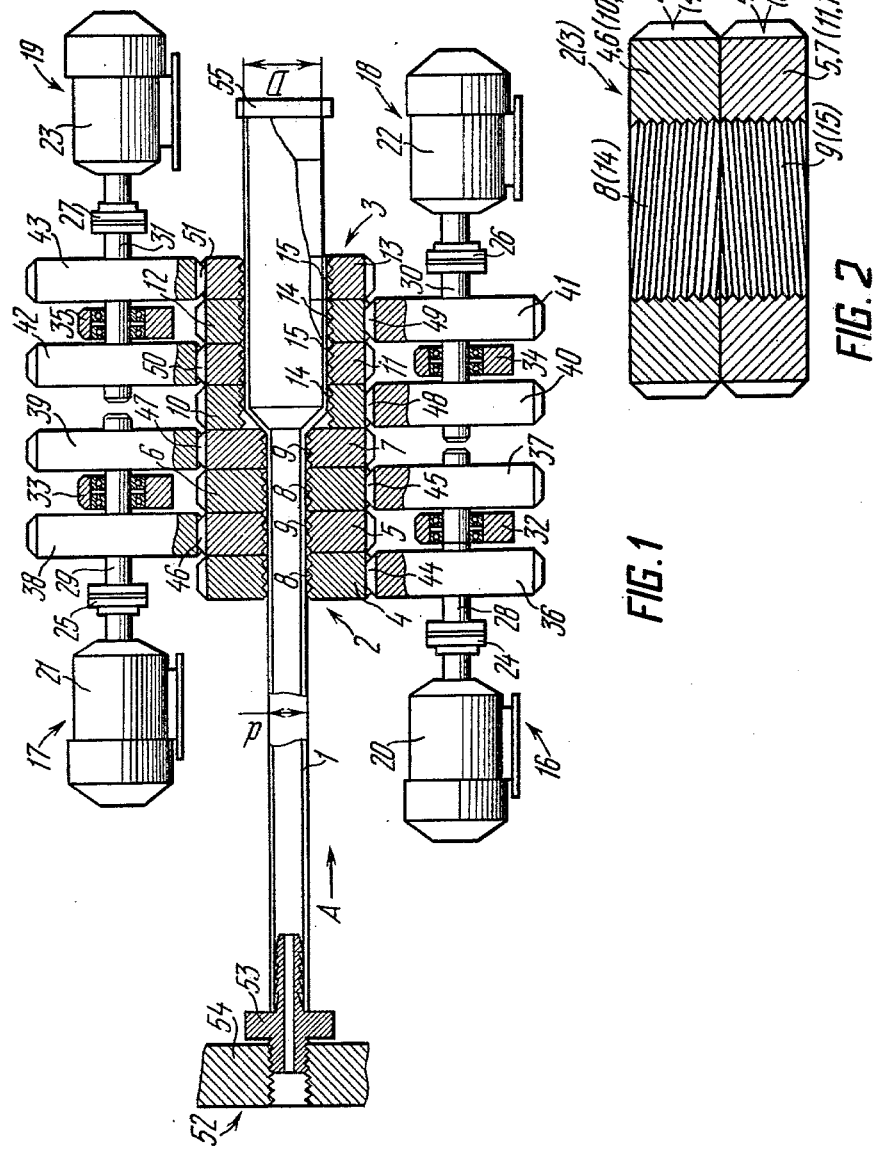
FIG. 1 is a longitudinal sectional view of a device for expanding heat-shrinkable polymer tubes, according to the invention.
FIG. 2 is a longitudinal sectional view showing a pair of bushes of both the inlet and the outlet cooling chambers, as illustrated in FIG. 1.

A device for expanding heat-shrinkable polymer tubes comprises an inlet chamber 2 and an outlet cooling chamber 3 arranged coaxially and consecutively for immediate contact in the direction of advancement of a polymer tube 1 (in the direction of the arrow A), the outlet cooling chamber 3 having a larger outer diameter D than an inner diameter d of the inlet chamber 2.

The inlet chamber 2 is made up of adjoining bushes 4, 5, 6 and 7 having at the inner surface thereof threads 8 and 9 of the opposite direction, as best shown in FIG. 2.

The outlet cooling chamber 3 (FIG. 1), like the inlet chamber 2, is made up of adjoining bushes 10, 11, 12 and 13 having at the inner surface thereof threads 14 and 15 of the opposite direction. The bushes making each pair of adjoining bushes of the inlet and outlet chambers 2 and 3, i.e. pairs of bushes 4–5 and 6–7, and 10–11 and 12–13, have threads 8 and 9 and 14 and 15 of the opposite direction as best shown in FIG. 2 (numerals relating to the outlet chamber 3 are parenthesized).

The bushes 4 (FIG. 1) and 6 and 5 and 7 of the inlet chamber and the bushes 10 and 12 and 11 and 13 of the outlet cooling chamber 3 make four groups, the threads of every one of which is of a common direction, e.g. threads 8 and 14 are for the group of bushes 4 and 6 and 10 and 12, whereas threads 9 and 15 are for the groups of bushes 5 and 7 and 11 and 13 respectively.

Each of said groups of bushes 4 and 6, 5 and 7, 10 and 12, and 11 and 13 is provided with an independent rotating drive 16, 17, 18 and 19 respectively, the rotating drive being kinematically linked with said bushes having a common direction of the threads 8, 9, 14 and 15.

The independent drives 16, 17, 18 and 19 are provided with electric motors 20, 23, 22 and 23, respectively, adapted to revolve shafts 28, 29, 30 and 31 mounted on roller bearings 32, 33, 34 and 35 via couplings 24, 25, 26 and 27. Mounted on each of the shafts 28, 29, 30 and 31 of the independent drives 16, 17, 18 and 19 are pairs of gear wheels 36 and 37, 38 and 39, 40 and 41, and 42 and 43 acting to rotate the groups of bushes 4 and 6, 5 and 7, 10 and 12, and 11 and 13 corresponding to each said drive through toothed engagement elements 44, 45, 46, 47, 48, 49, 50 and 51.

The herein proposed device is provided with a means 52 for creating overpressure inside the polymer tube 1. The means 52 is in the form of a nipple 53 secured in a wall 54 of an air pressure controlled vessel. The tube 1 to be expanded is fastened by one end thereof to the nipple 53, whereas the opposite outlet end thereof is sealed by a plug 55.

The device for expanding polymer tubes operates in the following manner.

The polymer tube 1 (FIG. 1) having an outer diameter d, essentially equal to the inner diameter d of the inlet chamber 2, is heated to a soft state. Thereafter the polymer tube 1 is fed into the inlet chamber 2 and is drawn into the outlet cooling chamber 3 by virtue of frictional engagement with the threads 8 and 9 of the bushes 4, 5, 6 and 7 rotated by the drives 16 and 17. The polymer tube 1 is then conveyed into the outlet cooling chamber 3, wherein expansion of the tube 1 takes place under the action of the overpressure created by the means 52 until the tube comes into contact with the threads 14 and 15 of the bushes 10, 11, 12 and 13 of the outlet cooling chamber 3, the bushes being rotated by the drives 18 and 19.

In order to prevent twisting of the expandable tube 1, the adjoining bushes 4 and 5, 5 and 6, 6 and 7, 7 and 10, 10 and 11, 11 and 12, and 12 and 13 of both chambers 2 and 3 are arranged to be rotated in the opposite directions. The bushes 4, 6, 10 and 12 having a common direction of the threads 8 and 14 are rotated in a common direction by the drives 16 and 18 respectively to coordinate the efforts enabling the axial advancement of the tube 1. The bushes 5, 7, 11 and 13 having threads 9 and 15 of the opposite direction are adapted to be rotated by the drives 17 and 19 having a common direction of rotation.

Due to inevitable longitudinal extension of the tube 1 in the expansion zone determined by an axial composite of excessive pressure, the bushes 10 and 12 and 11 and 13 are provided with the independent drives 18 and 19 to draw the tube 1 from the expansion zone with a preselected speed which helps utilize this longitudinal extension and facilitates the production of the tube 1 to be capable exclusively of radial shrinkage.

The herein proposed device affords to reduce the longitudinal extension of tubes as a result of tube advancement in the inlet and the outlet chambers capable of being controlled.

An increase in the production efficiency is determined in a device according to the invention by the longitudinal composite of the sliding friction of the expandable tube against the walls of both chambers being reduced to a minimum.

The herein proposed device also make it possible to produce heat-shrinkable polymer tubes featuring zero longitudinal shrinkage at high production speeds (e.g., up to 10 m/min). Notches on the tube surface resulting from contact thereof with the threads of the bushes can hardly be considered as defects, since in the process of shrinkage (i.e. return to the initial state) the tube surface becomes smooth again. In case of incomplete tube shrinkage, the remaining notches have no adverse effect on operating performance of the polymer tubes, provided the tube material is adequately thick.

It should be noted that the herein proposed device, apart from being simple to manufacture and assembly, features easy technological operation of tube expansion due to the fact that the inlet chamber can be used for tube heating because of heat liberation resulting from friction; the tangential composite force of friction by far exceeding the axial composite acting in the direction of acvancement of the tube being expanded. The absence of a heating chamber generally utilized in the heretofore known techniques of manufacturing heatshrinkable tubes permits a significant increase in effectiveness and reliability of the device.

In addition, the herein proposed device makes it possible to reduce the power of the drawing attachments to be employed, since the device itself is tube transported. All hereinbefore disclosed factors provide for a twofold efficiency and allow reduction in the power to be consumed in the course of operation of the device by 35 to 40 percent.

A concrete specific terminology has been used in the description of the herein proposed embodiment of the invention. However, it should be noted that the invention is not limited by the terms used and it has to be kept in mind that each such term includes all similar elements operating by analogy and utilized for solving similar technical problems.

While the invention has been described and illustrated with respect to a preferred embodiment thereof, it is to be understood that various changes and modifications are possible without departing from the spirit and scope of the invention to be obvious to those skilled in the art.

Such changes and modifications are understood as falling within the spirit and scope of the invention and the appended claims.

What is claimed is:

1. A device for expanding heat-shrinkable polymer tubes comprising:
   an inlet chamber including adjoining bushes provided with threads at the inner surface thereof, adjacent pairs of said bushes having threads of opposite direction;
   a first independent drive kinematically linked with said bushes having threads of a common direction to rotate said bushes;
   a second independent drive kinematically linked with said bushes having threads of a direction opposite to the direction of the threads of said bushes driven by the first drive to rotate said bushes;
   an outlet cooling chamber disposed coaxially and consecutively after said inlet chamber in the direction of advancement of said polymer tube and having a larger inner diameter than that of said inlet chamber, said outlet cooling chamber including adjoining bushes provided with threads at the inner surface thereof, adjacent pairs of bushes having threads of opposite direction;

a third independent drive kinematically linked with said bushes of said outlet cooling chamber having threads of a common direction to rotate said bushes;

a fourth independent drive kinematically linked with said bushes of said outlet cooling chamber having threads of a direction opposite to the direction of said bushes driven by the third drive to rotate said bushes; and means for creating overpressure inside said polymer tube.

* * * * *